US008577999B2

(12) United States Patent
Kneckt et al.

(10) Patent No.: US 8,577,999 B2
(45) Date of Patent: Nov. 5, 2013

(54) METHOD FOR WLAN NETWORK AND DEVICE ROLE ACTIVATION

(75) Inventors: Jarkko Kneckt, Espoo (FI); Janne Marin, Espoo (FI); Mika Kasslin, Espoo (FI)

(73) Assignee: Nokia Corporation, Espoo (FI)

( * ) Notice: Subject to any disclaimer, the term of this patent is extended or adjusted under 35 U.S.C. 154(b) by 157 days.

(21) Appl. No.: 12/322,360

(22) Filed: Jan. 30, 2009

(65) Prior Publication Data

US 2010/0198952 A1   Aug. 5, 2010

(51) Int. Cl.
G06F 15/177 (2006.01)

(52) U.S. Cl.
USPC .......................................... 709/220; 709/223

(58) Field of Classification Search
USPC .................................. 709/220, 223
See application file for complete search history.

(56) References Cited

U.S. PATENT DOCUMENTS

| 6,658,249 | B1 * | 12/2003 | Hietalahti et al. | 455/422.1 |
|---|---|---|---|---|
| 7,716,492 | B1 * | 5/2010 | Saulpaugh et al. | 713/185 |
| 2001/0026538 | A1 * | 10/2001 | Bruss | 370/329 |
| 2002/0122429 | A1 * | 9/2002 | Griggs | 370/401 |
| 2004/0171386 | A1 | 9/2004 | Mitjana | 455/452.2 |
| 2006/0215698 | A1 * | 9/2006 | Hamdan | 370/471 |
| 2006/0258375 | A1 | 11/2006 | Wilbrink et al. | 455/456.3 |
| 2007/0001853 | A1 | 1/2007 | Otranen | 340/572.1 |
| 2007/0026866 | A1 * | 2/2007 | Krishnamurthi et al. | 455/440 |
| 2008/0034081 | A1 | 2/2008 | Marshall et al. | 709/223 |
| 2008/0062945 | A1 | 3/2008 | Ahuja et al. | 370/342 |
| 2008/0219150 | A1 * | 9/2008 | Kagan et al. | 370/218 |
| 2009/0063622 | A1 * | 3/2009 | Cheng et al. | 709/203 |
| 2009/0092075 | A1 * | 4/2009 | Corson et al. | 370/328 |
| 2009/0265450 | A1 * | 10/2009 | Helmer et al. | 709/221 |
| 2009/0323552 | A1 * | 12/2009 | Beers et al. | 370/254 |
| 2010/0011098 | A1 * | 1/2010 | Sanborn et al. | 709/223 |
| 2010/0046468 | A1 * | 2/2010 | Oi et al. | 370/331 |
| 2010/0169446 | A1 * | 7/2010 | Linden et al. | 709/206 |

FOREIGN PATENT DOCUMENTS

| WO | WO-2005-114913 A1 | 12/2005 |
|---|---|---|
| WO | WO-2007-004010 A2 | 1/2007 |
| WO | WO-2007-057758 A2 | 5/2007 |
| WO | WO 2007/082036 A1 | 7/2007 |
| WO | WO-2008-002603 A2 | 1/2008 |
| WO | WO-2008-114081 A1 | 9/2008 |

* cited by examiner

*Primary Examiner* — Jason Recek
(74) *Attorney, Agent, or Firm* — Harrington & Smith (57) ABSTRACT

In response to receiving a capability advertisement message which comprises role capabilities, an activation message which requests at least one role capability of the capability is sent to a device on a bearer; and in response to the activation message, from the device on the bearer is received a notification message which indicates whether the role capability of the activation message was accepted. In another embodiment, a capability advertisement message which comprises role capabilities is sent; in response there is received on a bearer an activation message which requests at least one role capability of the advertisement message; and then in response to the activation message there is sent to the device on the bearer a notification message which indicates whether the role capability of the activation message is accepted.

20 Claims, 8 Drawing Sheets

| ELEMENT ID | LENGTH | CAPABILITY FIELDS |
|---|---|---|
| 302 | 304 | 306 |

FIG.3A

| BITS | | | | | | | |
|---|---|---|---|---|---|---|---|
| 2 | 2 | 2 | 2 | 2 | 2 | 2 | 2 |
| AVAILABLE NETWORK INSTANCE NUMBER | INFRASTRUCTURE AP CAPABILITY AND STATUS | INFRASTRUCTURE non-AP STA CAPABILITY AND STATUS | P2P AP CAPABILITY AND STATUS | P2P non-AP STA CAPABILITY AND STATUS | IBSS CAPABILITY AND STATUS | MP CAPABILITY AND STATUS | RESERVED |
| 306a | 306b | 306c | 306d | 306e | 306f | 306g | 306h |

| ORDER | INFORMATION | NOTES |
|---|---|---|
| N | NETWORK TYPE CAPABILITY | PRESENT IF THE dot11NetworkTypeInterworking is true |

| OCTETS | 1 | 1 | 1 | 2 | 6 | 1 | 1 | 1 |
|---|---|---|---|---|---|---|---|---|
| | CATEGORY (CAPABILITY ACTIVATION) | ACTION VALUE (ACTIVATION REQUEST) | DIALOG TOKEN | NETWORK TYPE CAPABILITY IE | BSSID | REGULATORY CLASS | CHANNEL NUMBER | ACK, PROPOSED TYPE AVAILABLE |
| | 404a | 404b | 404c | 404d | 404e | 404f | 404g | 404h |

METHOD FOR WLAN NETWORK AND DEVICE ROLE ACTIVATION

TECHNICAL FIELD

The present application relates generally to wireless communication systems, methods, devices and computer programs and, more specifically, relate to device capability advertising and discovery such as in ad-hoc or point-to-point or infrastructure wireless communication networks, such as for example wireless local networks and broadband wireless access networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

AP access point
BSSID basic service set identifier
DNS-SD domain name system service discovery
GAS generic advertisement service
IBSS independent basic service set
IEEE Institute of Electrical and Electronics Engineers
IE information element
IP Internet protocol
L3 layer 3
MAC medium access control layer; layer 2 or L2
MP mesh point
PHY physical layer
SSDP simple service discovery protocol
SSID service set identifier
STA station
UE user equipment
UPnP universal plug and play
WiMAX worldwide interoperability for microwave access
WLAN wireless local area network A device in wireless communication network uses service discovery to get information of the offered services in another device or network. Service discovery in WLAN networks may be done at layer 3 (L3) and above. It may be based on the MAC-level GAS procedure and relying on the protocols which run on top of the IP layer. The most widely used service discovery protocols are the ones specified in UPnP and Zeroconf (Zero Configuration Networking): namely SSDP and DNS-SD. Use of these protocols requires the client device to connect to the WLAN network and configure its IP layer. This is both time and power consuming. This has resulted in proposals to allow service discovery before network selection, which requires service information to be available at the WLAN MAC level, i.e. at layer 2. A STA may initiate service discovery by sending a GAS initial request frame. The STA may send the GAS initial request frame because the service information is not included in the beacon or probe response(s). Thus, the STA needs to complete a message exchange sequence to obtain the service information. In beacon and probe responses, an AP can inform a STA as to whether or not the AP supports GAS.

The IEEE 802.11 specification defines a capability information field that is available in multiple frames to indicate MAC and PHY capabilities for the network and the mode that are in use at the time frame in which that capability information was transmitted. Other devices remain unaware of any other capabilities for which the transmitting device may be capable, apart from those that are active in the transmitted frame.

SUMMARY

In one exemplary embodiment of this invention there is provided a method that comprises receiving from a device a capability advertisement message which comprises role capabilities of the device; in response to the capability advertisement message, sending to the device on a bearer an activation message which comprises a request for at least one role capability of the capability advertisement message; and in response to the activation message, receiving from the device on the bearer a notification message which indicates whether the role capability of the activation message was accepted.

In another exemplary embodiment of this invention there is provided a computer readable memory storing a program of computer executable instructions that when executed by a processor result in actions comprising: In response to receiving from a device a capability advertisement message which comprises role capabilities of the device, sending to the device on a bearer an activation message which comprises a request for at least one role capability of the capability advertisement message; and determining from a notification message received on the bearer from the device in response to the activation message whether the role capability of the activation message was accepted.

In still another exemplary embodiment of this invention there is provided an apparatus that includes an apparatus comprising: a receiver configured to receive from a device a capability advertisement message which comprises role capabilities of the device; and a transmitter configured, in response to the receiver receiving the capability advertisement message, to send to the device on a bearer an activation message which comprises a request for at least one role capability of the capability advertisement message. The receiver is further configured to receive from the device on the bearer, in response to the activation message, a notification message which indicates whether the role capability of the activation message was accepted.

In yet another exemplary embodiment of this invention there is provided an apparatus that includes receive means (for example a receiver) and sending means (for example, a transmitter). The receive means is for receiving from a device a capability advertisement message which comprises role capabilities of the device. The sending means is for sending to the device on a bearer, in response to the receive means receiving the capability advertisement message, an activation message which comprises a request for at least one role capability of the capability advertisement message.

In a further exemplary embodiment of this invention there is provided a method that comprises: sending a capability advertisement message which comprises role capabilities; in response to the capability advertisement message, receiving from a device on a bearer an activation message which comprises a request for at least one role capability of the capability advertisement message; and in response to receiving the activation message, sending to the device on the bearer a notification message which indicates whether the role capability of the activation message is accepted.

In a yet further exemplary embodiment of this invention there is provided a computer readable memory storing a program of computer executable instructions that when executed by a processor result in actions comprising: sending a capability advertisement message which comprises role capabilities; in response to the capability advertisement message, receiving from a device on a bearer an activation message which comprises a request for at least one role capability of the capability advertisement message; and in response to receiving the activation message, sending to the device on the bearer a notification message which indicates whether the role capability of the activation message is accepted.

In still a further exemplary embodiment of this invention there is provided an apparatus that includes a transmitter and a receiver. The transmitter is configured to send a capability advertisement message which comprises role capabilities. The receiver is configured to receive, on a bearer from a device in response to the transmitter sending the capability advertisement message, an activation message which comprises a request for at least one role capability of the capability advertisement message. The transmitter is further configured, in response to the receiver receiving the activation message, to send to the device on the bearer a notification message which indicates whether the role capability of the activation message is accepted.

In a further exemplary embodiment of this invention there is provided an apparatus that includes receive means (for example, a receiver) and sending means (for example, a transmitter). The sending means is for sending a capability advertisement message which comprises role capabilities. The receive means is for receiving, on a bearer from a device in response to the sending means sending the capability advertisement message, an activation message which comprises a request for at least one role capability of the capability advertisement message. The sending means is further, in response to the receive means receiving the activation message, for sending to the device on the bearer a notification message which indicates whether the role capability of the activation message is accepted.

These and other exemplary embodiments are detailed further below.

DETAILED DESCRIPTION

For clarity of description, we use the following terminology to distinguish three different devices that are used in the exemplary embodiments detailed below: the device that receives capability information from another device in its network is termed the discovering apparatus, device, UE, MP or STA; the device that sends/advertises its own capability information (which is received at the discovering device) is termed the reporting apparatus, device, MP or STA; and there may be a third device that is brought into the network of the discovering device via the reporting device, or alternatively that is linked to the discovering device via the reporting device via two networks anchored by the reporting device. This will simply be termed a third apparatus, device, UE, MP or STA. Note that a MP in a mesh or STA in ad-hoc network may also be an AP and may take on any of the device roles as termed above. Also a non-AP STA in a BSS may operate as an AP in another BSS. Any individual device may act as discovering, reporting, or third devices at different times, and at certain times may take on two or all three of those functions simultaneously depending on its interaction/message exchanges with other entities.

The exemplary capability advertising and discovery mechanisms presented herein include a MAC layer protocol and related MAC frames to support networking and related device role capability advertising, detection and activation of those prior non-active capabilities. For the activation purposes there are activation request frames/messages and activation response frames/messages detailed below. Additionally, in an exemplary embodiment beacon and probe response frames/messages may be used to distribute that information in network.

Figure 1:
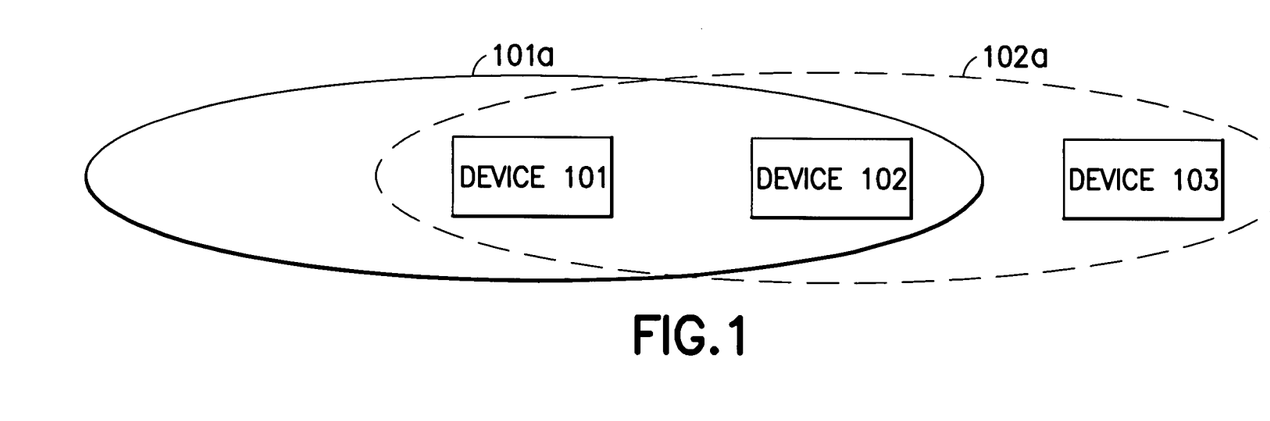
FIG. 1 illustrates for examples a case in which three devices forming two different networks in which two of the devices can only communicate if the remaining device operates as a go-between, such as by establishing a mesh network.

FIG. 1 illustrates a schematic diagram of an exemplary environment in which the below teachings may be used. Three devices are shown of which a first device 101 is a discovering device, a second device 102 is a reporting device, and there is also a third device 103. The coverage area of a first network 101a in which the first device 101 and the second device 102 are currently active does not extend to the third device 103. A theoretical coverage area of a second network 102a, which is not yet set up in this embodiment, is shown by dashed line and represents the extent of a network for which the second device 102 would be the AP if the second device 102 takes on that role. Stipulate that the coverage area of the second network 102a would include the first device 101 if that second network 102a were set up.

Figure 2:
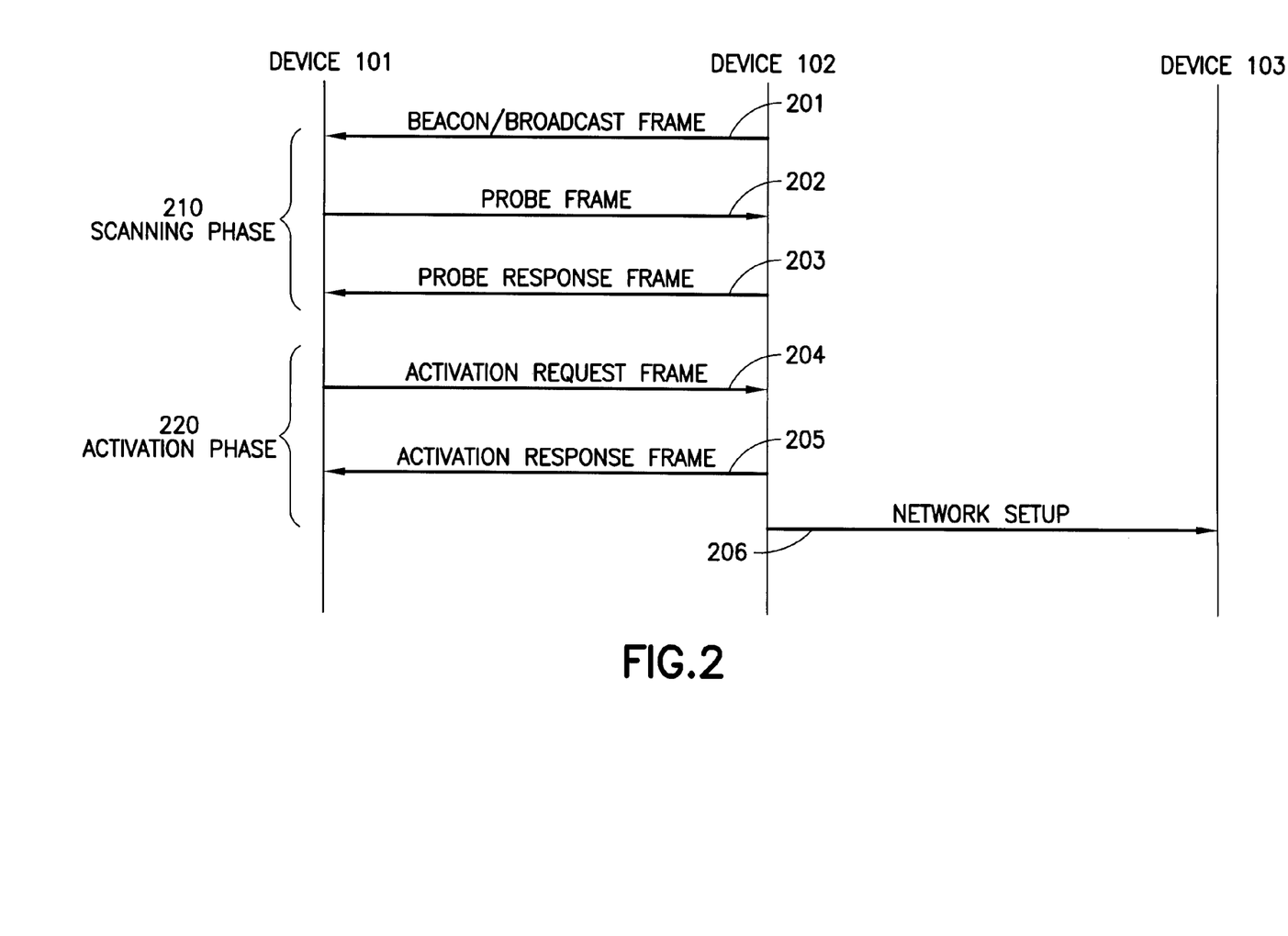
FIG. 2 illustrates a signaling diagram according to an exemplary embodiment of the invention for the three devices arranged as in FIG. 1.

If the first device 101 wants to communicate with the third device 103 which it does not yet know exists, has to know the capability information about the second or reporting device 102 to the first or discovering device 101. FIG. 2 is a signaling diagram that illustrates two exemplary embodiments for how that happens. The reporting device 102 sends at 201 its beacon frame or beacon message, which may be considered a broadcast frame or message, which is received and read by the discovering device 101. According to an exemplary embodiment of these teachings, the beacon frame 201 includes information elements that indicate the transmitting device's 102 capability or capabilities to operate in different network types (in addition to or other than the first network 101a which is active). Examples of different network types include an infrastructure-type network, a peer-to-peer type network, an ad hoc-type network, a mesh-type network or the like.

Also with the network type capability information, the transmitting device indicates its role capabilities in at least some of the networks. For the case where the network-type information is specified to include the active network type(s) as well as the inactive type capabilities, there is in an exemplary embodiment an indication whether that particular network type is in use by the reporting device 102 at the time the beacon 201 is transmitted. In another embodiment, which may or may not be in conjunction with the in-use indication, the beacon 201 may also include an indication of the number of concurrent networks for which the reporting device 102 is capable of supporting, and the specific device roles that it can assume.

In an alternative exemplary embodiment also shown in FIG. 2, instead of a beacon frame 201 the above information elements may be sent by the reporting device 102 in a probe response frame 203, which the reporting device 102 may send automatically in reply to receiving from the discovering device 101 a probe frame 202. In this manner the discovering device 101 can get the capability information of the reporting device 102 through a normal scanning procedure.

In an exemplary embodiment, only some of the information elements detailed above (for example, network-type capability) may be sent in the beacon frame 201, and other more particularized information elements (for example, number of concurrent networks the reporting device 102 is capable of supporting and/or the specific device roles that it can assume) are sent only in the probe response message 203. Various combinations of the above may be used to minimize control signaling overhead, based on how frequent such information may be needed and/or on how common is a multi-network capability of devices in wireless local networks or broadband wireless access networks.

The beacon message 201 and the probe response message 203 which may carry the capabilities information detailed above may be considered more generically to be a capability advertisement message that may be transmitted by the reporting device 102 and received by the discovering device 101. This may be considered the scanning phase 210, and the beacon message 201 and the probe response message 203 may be sent on bearers already set up in the existing network 101a.

Assume now that the discovering device would like the reporting device 102 to take on a new role or network combination that the discovering device 101 sees from the received capability advertisement message that the reporting device 102 is capable of performing. After the scanning phase 210 there may be an activation phase 220 in which the discovering device 101 requests the reporting device 102 to start operating in one of its capability-advertised roles in a capability-advertised network (where the reporting device 102 was not active in the requested role, network, or role/network combination during the scanning phase 210).

In an exemplary embodiment the discovering device 101 then begins the activation phase 220 by sending an activation request message 204 (activation request frame) to the reporting device 102 which requests that the reporting device 102 to start operating in a certain role in a given network type. At this phase 220 the reporting device 102 may be considered a requested device; and the discovering device 101 may be considered as the requesting device. In an embodiment the discovering/requesting device 101 is restricted to requesting only one role and network type combination in a single activation request frame 204. In the activation request frame 204 the discovering or requesting device 101 specifies what is the network type (for example infrastructure, peer-to-peer, ad hoc or mesh) to be used between it and the reporting or requested device 102 and, if applicable, what role (for example AP or client) the reporting or requested device 102 should take in that requested network. Additionally the discovering or requesting device 101 may include in exemplary embodiment information (for example SSID, BSSID and frequency channel) about the requested network within the activation request message 204. In an exemplary embodiment for the case where the activation request message 204 requests the reporting or requested device 102 to take an AP role, either in an infrastructure type network or in a peer-to-peer type network, the devices 101, 102 understand that the values for the network information are proposed values and the reporting or requested device 102 is not bound by those values; it has the authority to change them while setting up the requested network-type for which it may be the AP.

When the reporting or requested device 102 receives the activation request frame 204, it processes the frame and decides on whether to accept the request. The reporting or requested device 102 replies in an exemplary embodiment with an activation response message 205 or activation response frame, which is directed to the discovering or requesting device 101 and which indicates whether the request was accepted. If the request was such that the reporting/requested device 102 was requested to take an AP role either in an infrastructure-type network or in a peer-to-peer-type network, the reporting/requested device 102 needs to decide on the network parameters. The reporting/requested device 102 indicates the network parameters of the available network in the activation response message 205.

The proposed values which were received in the activation request frame 204 from the discovering/requesting device 101 should be taken into account when fixing the parameter values for the new network. In a particular embodiment the activation response frame 205 only includes the parameter values that differ from those which the discovering/requesting device 101 sent in the activation request frame 204. In a different embodiment the activation response frame 205 includes the parameter values for the new network regardless of those which were requested in the activation request frame 204.

Upon transmitting the activation response message 205 with positive response, the reporting device 102 either may start a new network of the requested type or may start looking for the network to be started by the discovering device 101. The reporting device 102 may start the new network if it was requested to take an AP role in an infrastructure-type or peer-to-peer-type network, or if it is requested to take an MP role in a mesh-type network. In other cases the reporting device 102 may start looking for the network that may be created by the discovering device 101.

There are certain instances in which the reporting/requested device 102 may change its network-type while it is in an AP role with a third device 103, and end its AP role in its pre-existing network 102a with the third device 103. This is possible because device 102 may also know the inactive capabilities of the third device 103 via the same scanning phase 201 as was detailed above between the first device 101 and the second device 102. It may be that all the devices (device 103 shown) for which the second device 102 is acting as AP during the described scanning phase 210 between the first 101 and second 102 devices are also capable for the new network-type, and so the second device 102 knows it can change the network-type while remaining as AP and still serve those other devices 103 as AP in the new network. In this case the second device 102 may send a new network setup message 206 to the third device 103 (and other similarly-capable devices) with the values for the new network parameters.

FIG. 2 and the above description detail an overview of the signaling process. Below with reference to FIGS. 3A through 5 are detailed exemplary embodiments of how those new capability-information elements may be disposed in the described frames, in a manner that may be readily implemented with WLAN frame structures.

Figure 3A:
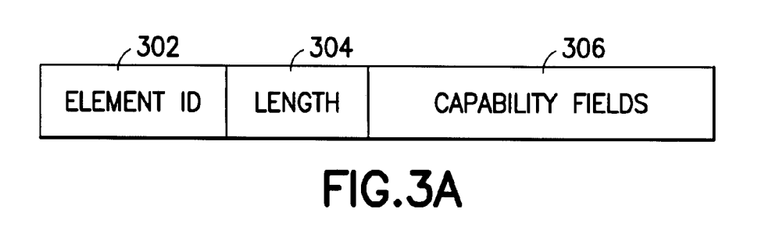
FIGS. 3A-B illustrate schematic diagrams of an exemplary network-type capability information element (FIG. 3A) and exemplary fields (FIG. 3B) of that information element that may be in the broadcast frame or probe response frame of FIG. 2, according to an exemplary embodiment of the invention.

With reference to the capability advertisement message 201, 203, there may be a network-type capability information element IE shown by example at FIG. 3A, which indicates the network types which the device 102 sending that message 201, 203 supports. Certain capability fields of the network-type capability IE may also be carried in the activation request message 204 and in the activation response message 205, for which examples are given below. FIG. 3A illustrates an exemplary IE with element ID 302, length in bits 304 and capability fields 306.

Figure 3B:
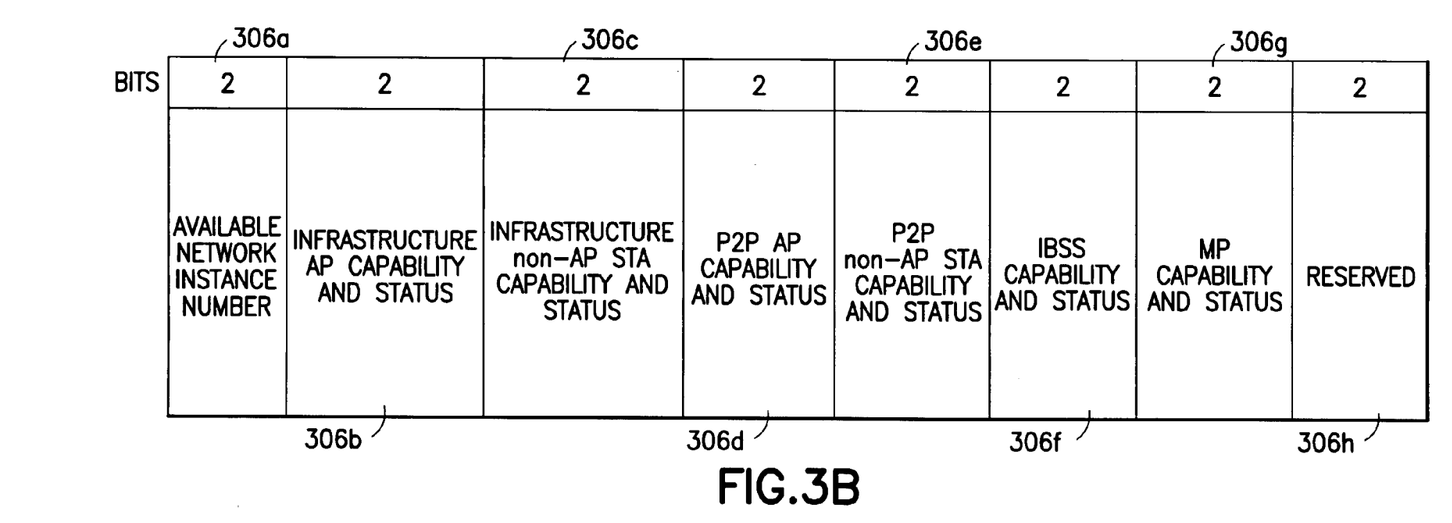

FIG. 3B illustrates an exemplary embodiment of the capability fields 306. Specific embodiments may use less than all of those illustrated fields, or only one of them or some combination of some but not all of them. FIG. 3B is seen to be comprehensive and certain network types may be rare enough that L3 discovery may be used for their setup. The bit values below are exemplary and may be changed to have other of the described meanings without departing from these teachings, so long as both discovering/requesting device 101 and reporting/requested device 102 both understand a priori the same meaning for bit values.

An available network instance number field 306a is by example two bits in length and indicates number of free/available network instances in the device 102. It may be set to a value that indicates how many network instances other than the existing ones the device may have. Value 00 may identify that there are no free instance resources, and so a new network would necessarily mean that an existing one needs to be closed. This field 306a may only be used in the capability detection phase and may have no role in capability activation.

There may be an infrastructure AP capability and status field 306b which is two bits in length and represents the reporting device's 102 capability to operate as AP in an infrastructure network and whether the capability is currently in use/active. Exemplary values for the two bits of the capability and status field may be:

Value 00=Capability Not Supported. This bit sequence in field 306b may indicate that the reporting device has no such networking and role capability.

Value 01=Capability Supported. This bit sequence in field 306b may indicate that the reporting device 102 is capable to operate in the network in the indicated role and the capability is not in use Value 10=Capability in Use. This bit sequence in field 306b may indicate that the reporting device 102 is both capable to operate in the network in the given role and is currently using that capability.

Value 11=Request to Use. This bit sequence in field 306b may indicate that the discovering device 101 is requesting the reporting/requested device 102 to start operating in the given role in the requested network type. The discovering/requesting device 101 needs to ensure before the request 204 that the reporting/requested device 102 to which the request 204 is issued has the networking capability. This bit sequence in this field 306b is used only in activation request frames 204.

There may be an infrastructure non-AP STA capability and status field 306c, which may be two bits in length and which may represent the reporting device's 102 capability to operate as a non-AP STA (i.e. a client terminal) in an infrastructure network and whether the capability is currently in use/active. The four values may be similar as those noted above for the infrastructure AP capability and status field 306b.

There may be a Peer-To-Peer (P2P) AP capability and status field 306d which may be two bits in length and which may represent the reporting device's 102 capability to operate as an AP in a peer-to-peer-type network and whether the capability is currently in use/active. The four values may be similar as those noted above for the infrastructure AP capability and status field 306b.

There may be a Peer-To-Peer non-AP STA capability and status field 306e which may be two bits in length and which may represent the reporting device's 102 capability to operate as non-AP STA in Peer-To-Peer network and whether the capability is currently in use/active. The four values may be similar as those noted above for the infrastructure AP capability and status field 306b.

There may be an IBSS capability and status field 306f which may be two bits in length and which may represent the reporting device's 102 capability to operate in IBSS, and whether the reporting device 102 is currently operating in IBSS. The four values may be similar as those noted above for the infrastructure AP capability and status field 306b.

There may be a MP capability and status field 306g which may be two bits in length and which may represent the reporting device's 102 capability to operate as MP and whether the reporting device 102 is currently operating as MP. The four values may be similar as those noted above for the infrastructure AP capability and status field 306b.

Field 306h is two bits but is not currently proposed for a specific meaning in the above scanning 210/activation 220 signaling. This field could be used for future purposes.

Figure 4A:
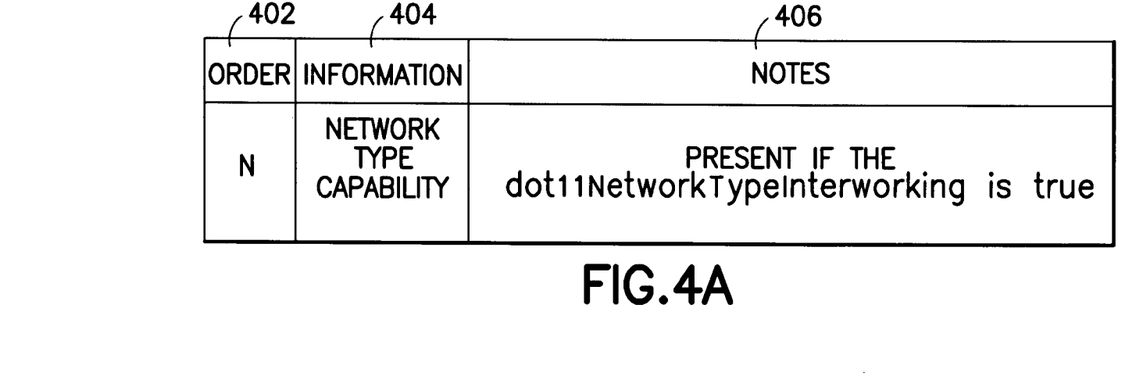
FIGS. 4A-B illustrate schematic diagrams of an exemplary network-type capability information element (FIG. 4A) and an exemplary frame structure (FIG. 4B) which includes that information element (FIG. 4B) for the activation request and activation response frames of FIG. 2, according to an exemplary embodiment of the invention.

FIG. 4A illustrates how the beacon frame 201 and probe response frame 203 may be modified to account for the network type capability IE, with order 402, information element name 404 and notes 406 which may be stipulated in a WLAN specification. It is noted that in the notes column 406, the term "dot11NetworkTypeInterworking" is a master information block (MIB) variable that is used to specify conditions for frame field presence.

Figure 4B:
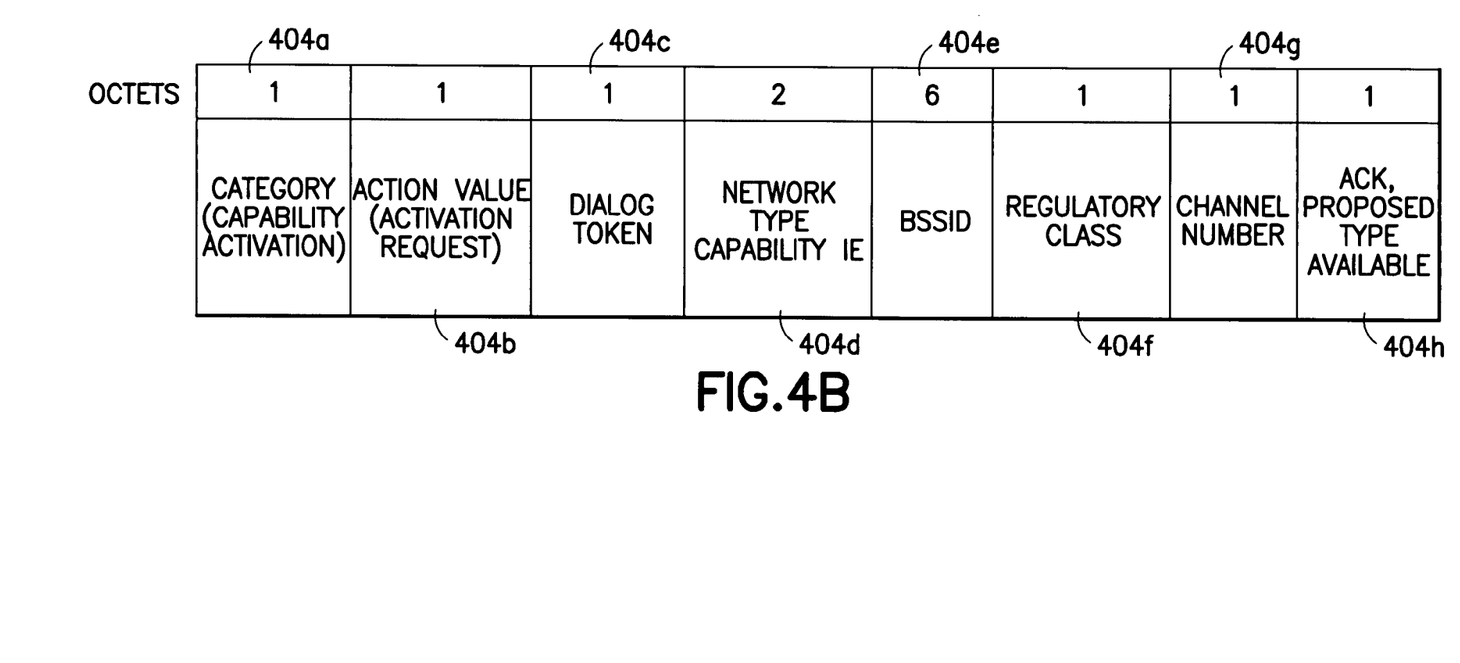

In the activation phase 220, there may be inactive capabilities which are activated. FIG. 4B illustrates different fields of the action frame format for the activation request message 204 and the activation response message 205. The conventional action frame is a specific MAC management frame that is a kind of protocol message container to be used for various MAC protocols. For example, unicasted probe request and probe response frames may be used as activation request and response frames.

The fields FIG. 4B may be used in both the activation request message 204 and in the activation response message 205. Specifically, there may be a category field 404a, an action value field 404b, a dialog token field 404c, a network type capability field 404d, a BSSID field 404e, a regulatory class field 404f, and/or a channel number field 404g. There may be further an acknowledge/proposed type available field 404h which may be one bit, and which may be set in the activation response message 205 to indicate (set for example to 1) if the reporting device 102 is capable of operating in one or more of the requested roles (set for example to 0 if not capable).

In a particular embodiment, the category field 404a and the action value fields 404b are set to values indicating the activation response frame 205. The value of dialog token field 404c in an activation request action frame may be arbitrary. The value of the dialog token field in an activation response frame may be copied from each activation request action frame. The network type capability IE 404d may be detailed above for its various fields with respect to FIG. 3B for the same IE that was described for the beacon 201 and/or probe response 203 frames. The BSSID field 404e may give the basic service set identifier for the new network being setup; the regulatory class field 404f may give the channel set for which the channel number field 404g applies. Together the regulatory class 404f and channel number 404g fields specify the channel frequency and spacing for the channel to be used in the new network. The acknowledge/proposed type available field 404h may indicate to the reporting device if it is capable to operate in the proposed role.

As can be seen from the above exemplary and specific teachings, certain embodiments of the invention provide the following technical aspects:

Devices share information of the available WLAN network types and the devices may negotiate the most appropriate network type based on their capabilities and application requirements.

A discovering device scans infrastructure/IBSS and finds an AP that has mesh capability. Then it requests the mesh to be activated and the AP becomes a mesh-AP with both MP and AP roles active and the discovering device can get connected with mesh to the AP (it is noted that this case may be essential for WFA Peer-to-Peer devices).

A reporting device with infra or point-to-point AP capability is found in IBSS mode. A discovering device which prefers to get connected to the reporting device as a client and requests the reporting device to start operating as an infra or point-to-point AP. The reporting device activates infra or point-to-point AP mode and can stay in IBSS as well or turn it off (this is seen to be particularly effective if there are no other devices in the IBSS network).

Figure 5A:
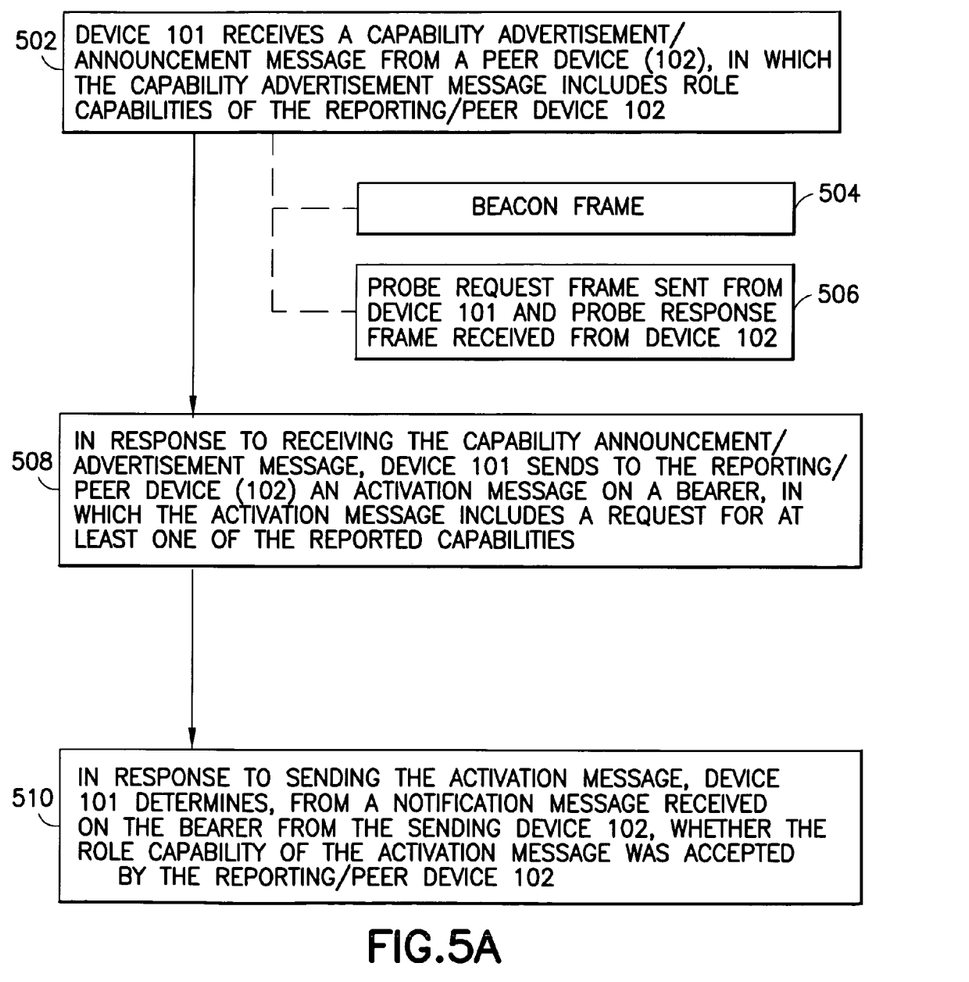
FIGS. 5A-B are logic flow diagrams that illustrate the operation of a method, and a result of execution of computer program instructions embodied on a computer readable memory, in accordance with the exemplary embodiments of this invention for a reporting device and a discovering device, respectively.
Figure 5B:
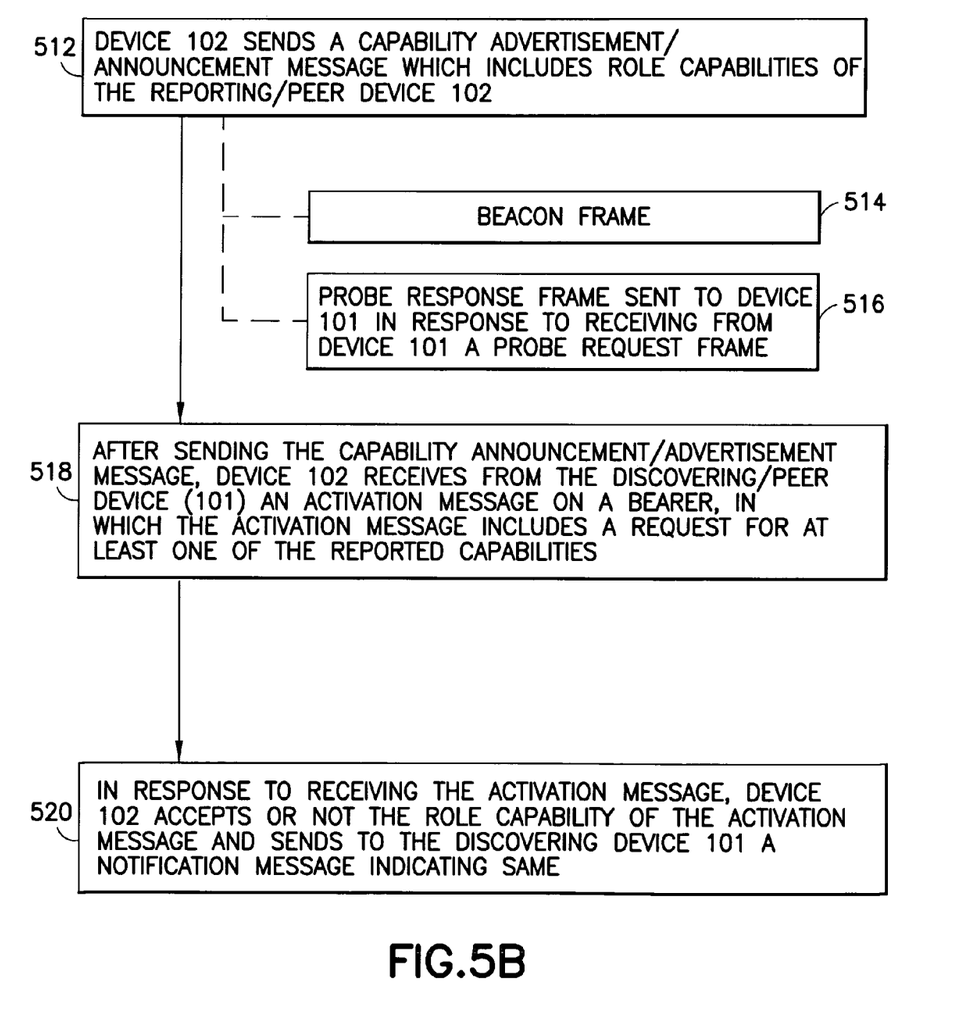

FIGS. 5A-B are logic flow diagrams that illustrates the exemplary operation of a method, and a result of execution of computer program instructions, in accordance with the exemplary embodiments of this invention. Exemplary messages noted at FIGS. 5A-B are detailed at FIG. 2. FIG. 5A illustrates from the perspective of the discovering/requesting device 101 and FIG. 5B illustrates from the perspective of the reporting/requested device 102.

In accordance with the exemplary embodiment at FIG. 5A, at block 502 the discovering device 101 receives a capability advertisement message from the reporting device 102. Both devices 101, 102 are peer devices. The capability advertisement message is sent on a bearer and includes role capabilities of the reporting device 102. At block 504 the received capability advertisement message may be a beacon frame, and at block 504 the capability advertisement message is a probe response which the discovering device 101 receives in reply to receiving from the reporting device 102 the discovery device's probe request frame. For the case of block 506, the probe request and probe responses are both communicated on the same bearer.

At block 508, in response to receiving from the reporting device 102 the capability announcement message, the discovering device 101 sends to the reporting device 102 an activation message on a bearer (same bearer in the case of probe request/response at block 506), and this activation message includes a request for at least one of the reported capabilities which was in the received capability advertisement message. If the requested capability is not inactive, the discovering device 101 may get the network parameters of the already available network or the requested device 102 joins or creates a network with network parameters indicated in the activation request frame.

Then at block 510 and in response to sending the activation message at block 508, the discovering device 102 receives from the reporting device 102 (on the same bearer as it sent the activation message at block 508) a notification message, and the discovering device 101 determines from that notification message whether the role capability of the activation message was accepted by the reporting device 102. In an embodiment, a new network is set up and the notification message include parameters for the new network which are based on (may or may not be identical to) the parameters which the requesting device 101 sent in the activation message of block 508.

In accordance with the exemplary embodiment at FIG. 5B, at block 512 the reporting device 102 sends a capability advertisement message which indicates role capabilities of the reporting device 102. This may be sent in a beacon frame at block 514, or as in block 516 it may be a probe response which the reporting device 102 sends to the discovering device 101 in response to receiving the discovery device's probe request frame. Both devices 101, 102 are peer devices. For the case of block 516, the probe request and probe responses are both communicated on the same bearer.

At block 518, after sending the capability announcement/advertisement message, the reporting device 102 receives from the discovering device 101 an activation message on a bearer (same bearer in the case of probe request/response at block 516), and this activation message includes a request for at least one of the reported capabilities which was in the reporting device's capability advertisement message. If the requested capability is not inactive for the reporting device 102, the reporting device 102 may send to the discovering device 101 the network parameters of the already available network or the reporting device 102 may join or create a network with network parameters based on parameters in the activation request frame.

Then at block 520 and in response to receiving from the discovering device 101 the activation message at block 518, the reporting device 101 sends to the discovering device 101 (on the same bearer as it received the activation message at block 518) a notification message which indicates whether the reporting device 102 has accepted the role capability of the activation message. In an embodiment, the reporting device 102 sets up a new network and the notification message include parameters for the new network which are based on (may or may not be identical to) the parameters which were in the activation message that the reporting device 102 received at block 518.

The various blocks shown in FIGS. 5A-B may be viewed as method steps, and/or as operations that result from operation of computer program code, and/or as a plurality of coupled logic circuit elements constructed to carry out the associated function(s). It is noted that the entire signaling protocol of FIGS. 2 and 5A-B are in the MAC layer, and the two devices 101, 102 are peer devices in a WLAN network or similar wireless networks during the scanning phase 210.

Figure 6A:
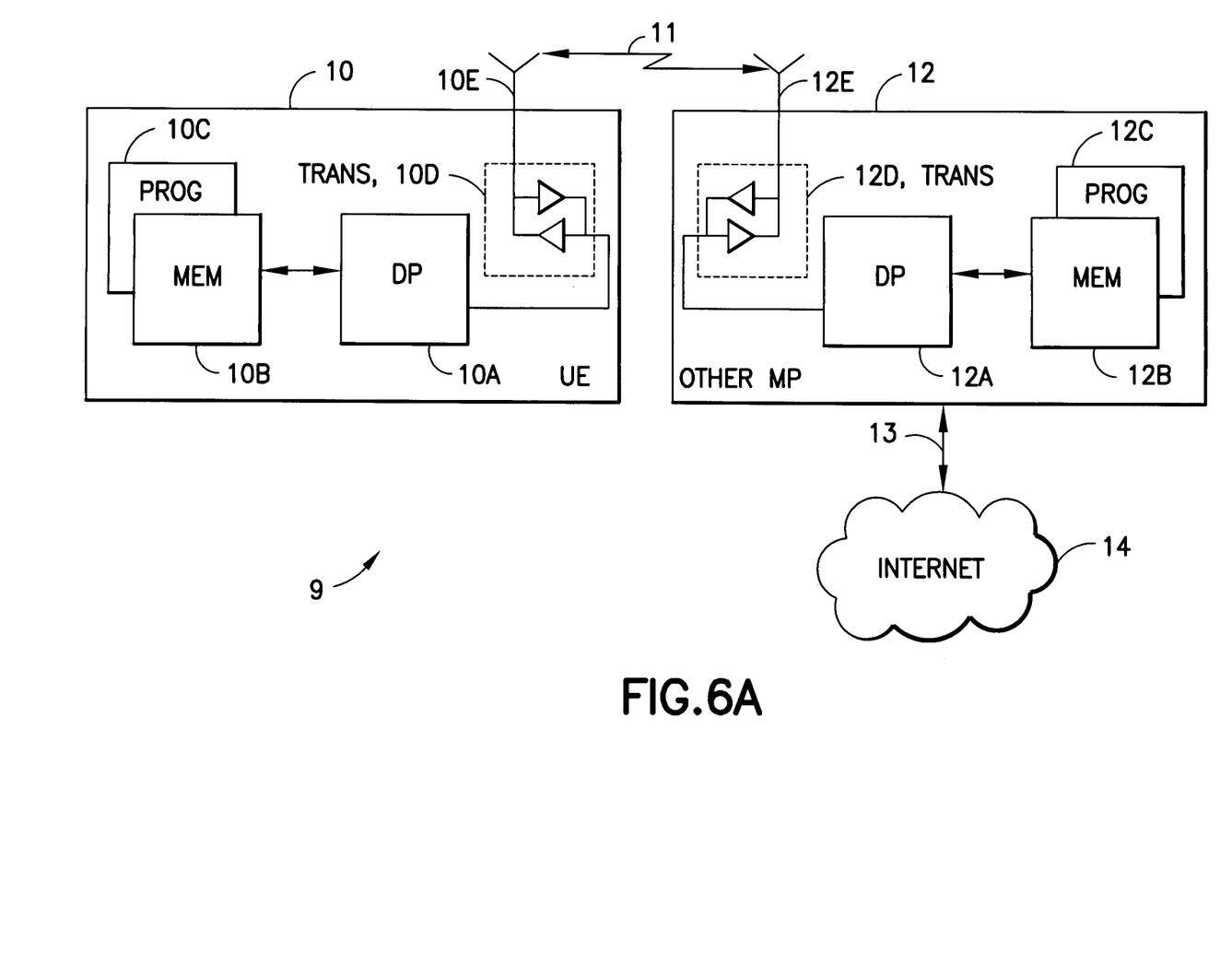
FIG. 6A shows a simplified block diagram of various electronic devices that are suitable for use in practicing the exemplary embodiments of this invention.

FIG. 6A illustrates a simplified block diagram of various electronic devices and/or apparatus that are suitable for use in practicing the exemplary embodiments of this invention. In FIG. 6A a wireless communication network (for example mesh or ad-hoc or the like) is adapted for communication over a wireless link 11 between an apparatus, such as a mobile communication device which may be referred to as a UE 10, and another device as MP 12 which may also be a UE itself.

The other MP 12 may include a gateway functionality shown in FIG. 6A which provides connectivity with a broader network 14 such as the Internet or some other data communications network. The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the other MP 12 via one or more antennas 10E. The other MP 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas 12E. The other MP 12, when acting as access point for the mesh network 9, is coupled via a data path 13 to the broader network 14. The UE 10 and the other MP 12 may also be coupled to other elements of the system 9 such as further MPs (for example, device 103 in FIG. 2) to which they are linked via direct single-hops or only via multi-hops.

At least one of the PROGs 10C and 12C is assumed to include program instructions that, when executed by the associated DP, enable the device to operate in accordance with the exemplary embodiments of this invention, as detailed above. Either of the MPs 10, 12 may be in the position of either of the devices 101, 102 during the scanning phase 210. For example, if the other MP is in the position initially of a non-mesh AP 12, the message exchange detailed above may cause the non-mesh AP to change itself to a mesh AP. Or if the other MP 12 is in the position initially of a non-AP MP, the message exchange detailed above may cause the non-AP MP 12 to change itself to an AP.

That is, the exemplary embodiments of this invention may be implemented at least in part by computer software executable by the DP 10A of the UE 10 and/or by the DP 12A of the other MP 12, or by hardware, or by a combination of software and hardware (and firmware).

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

Figure 6B:
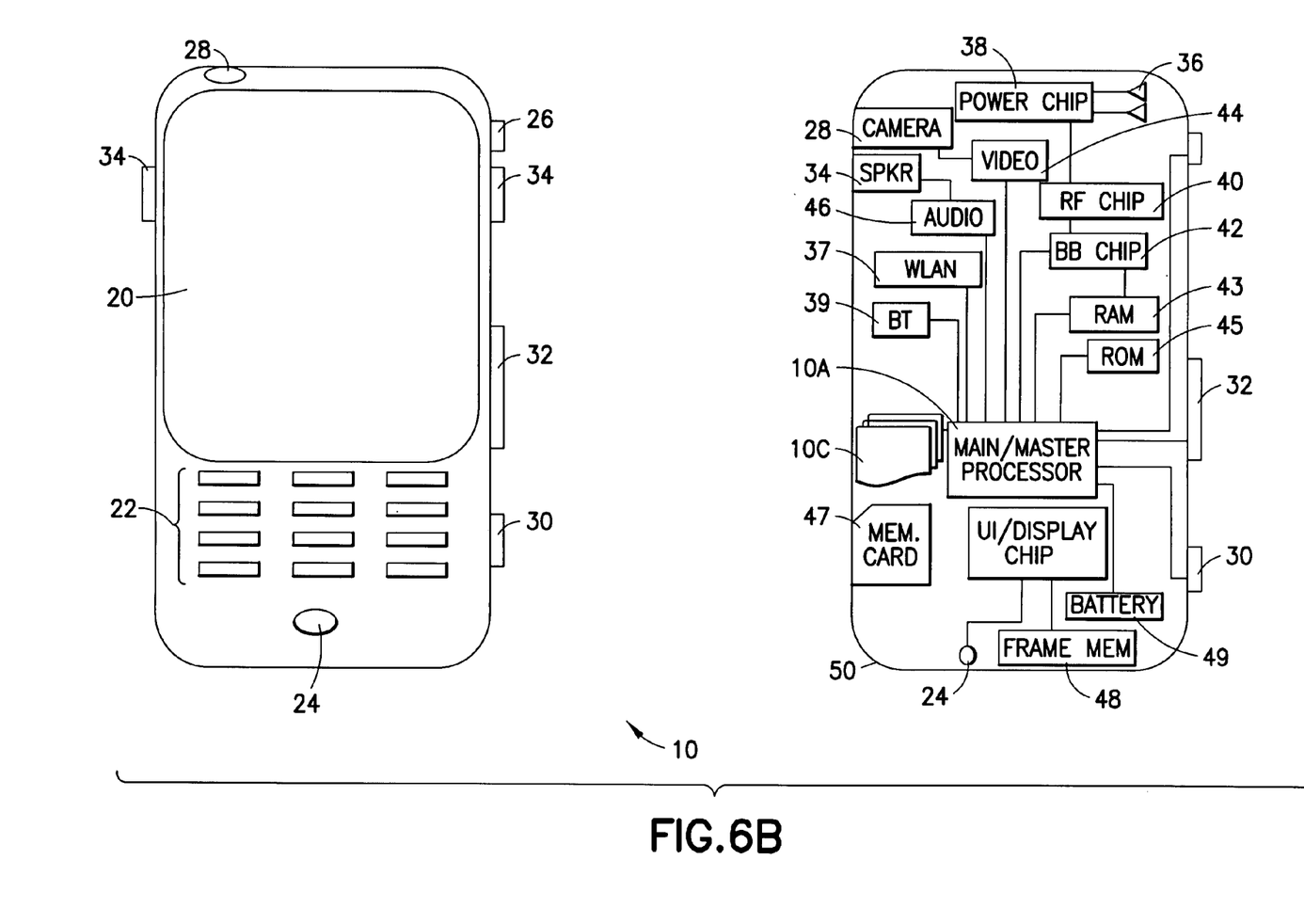
FIG. 6B shows an exemplary more particularized block diagram of a user equipment such as that shown at FIG. 6A.

FIG. 6B illustrates further details of an exemplary embodiment of an UE or a MP in both plan view (left) and sectional view (right), and the invention may be embodied in one or some combination of those more function-specific components. At FIG. 6B the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (for example, for video calls) but may alternatively or additionally be rearward facing (for example, for capturing images and video for local storage). The camera 28 is controlled by a shutter actuator 30 and optionally by a zoom actuator 30 which may alternatively function as a volume adjustment for the speaker(s) 34 when the camera 28 is not in an active mode.

Within the sectional view of FIG. 6B are seen an exemplary embodiment with multiple transmit/receive antennas 36 that may be used for cellular communication. The antennas 36 may be multi-band for use with other radios in the UE. There might be embodiments where only a single antenna may be used. The power chip 38 controls power amplification and outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 may be passing through an image/video processor 44 which encodes and decodes the various image frames. A separate audio processor 46 may also be present controlling signals to and from the speakers 34 and the microphone 24. The graphical display interface 20 may be refreshed from a frame memory 48 as controlled by a user interface chip 50 which may process signals to and from the display interface 20 and/or additionally process user inputs from the keypad 22 and elsewhere.

Certain embodiments of the UE 10 may also include one or more further radios for example a wireless local area network radio WLAN 37 and Bluetooth® radio 39. Either or both of these radios may incorporate an antenna on-chip or be coupled to an off-chip antenna. Throughout the apparatus are various memories such as random access memory RAM 43, read only memory ROM 45 (and in some embodiments removable memory such as the illustrated memory card 47) on which the various programs 10C are stored. All of these components within the UE 10 may be powered by a portable power supply such as a battery 49.

The aforesaid processors 38, 40, 42, 44, 46, 50, if embodied as separate entities in a UE 10 may operate in a slave relationship to the main processor 10A, which may then be in a master relationship to them. The exemplary embodiments of this invention may be relevant to the WLAN chip 37, and in some embodiments the functionality added by these teachings may be implemented in the main processor 10A. For an example of the latter, these teachings may in some cases be implemented within WLAN MAC management that uses the WLAN service access point (SAP), which is sometimes located in the main processor 10A. Different specific device architectures may make different functional splits among the baseband (BB) chip 42, the WLAN chip 37, and the main processor 10A, or may impose all the relevant functionality to implement these teachings in only one of them. It is noted that other embodiments need not be disposed there but may be disposed across various chips and memories as shown or disposed within another processor that combines some of the functions described above for FIG. 6B. Any or all of these various processors of FIG. 6B access one or more of the various memories, which may be on-chip with the processor(s) or separate there from. Similar function-specific components that are directed toward communications over a mesh or ad-hoc network or the like (for example, components 36, 38, 40, 42-45 and 47) may also be disposed in exemplary embodiments of the other MP 12, which may have one or more antennas not necessarily the same number as shown for the UE 10.

Note that the various chips (for example, 38, 40, 42, etc.) that were described in the exemplary embodiment above may be combined into a fewer number than described and, in a most compact case, may all be embodied physically within a single chip. Exemplary embodiments of the invention may be embodied within the baseband chip 42 where the various messages are opened and decoded and responses are compiled or in the main DP 10A, or in some combination of chips. Any other functional and operational splitting may be applicable including other processors, parts, module or combinations in an apparatus.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the exemplary embodiments of the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of a WLAN system, it should be appreciated that the exemplary embodiments of this invention are not limited for use with only this one particular type of wireless communication system, and that they may be used to advantage in any other mesh or ad-hoc wireless communication systems or broadband wireless access systems, such as for example WiMAX and Bluetooth as non-limiting other environments.

Further, the various names used for the described parameters (for example beacon frame, probe response, etc.) are not intended to be limiting in any respect, as these parameters may be identified by other suitable names in WLAN as it develops over time and/or in other types of networks.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Additionally, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
receiving, in a first network of a first network type at a first device from a second device, a capability advertisement message which comprises role capabilities of the second device for at least a second network type, where a role capability for a given network type describes a device role the second device can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the second device is capable of assuming the given device role in the given network;
in response to receiving the capability advertisement message, sending, in the first network from the first device to the second device, an activation message which comprises a request that the second device become active in a second network of the second network type for at least one of the role capabilities of the capability advertisement message and parameters for the second network; and
in response to the activation message, receiving, in the first network at the first device from the second device, a notification message which indicates whether the request of the activation message was accepted.

2. The method according to claim 1, in which the role capabilities comprise an indication of at least two roles for at least one of the first and second network types, and for each of the at least two roles an indication of whether the respective role is currently active for the second device.

3. The method according to claim 2, wherein the indication of the at least two roles for at least one of the first and second network types comprises an indication for at least three of: access point role in an infrastructure-type network; access point role in a peer-to-peer-type network; non-access point station role in an infrastructure-type network; and non-access point station role in a peer-to-peer-type network.

4. The method according to claim 1, in which the capability advertisement message further comprises an indication of how many available network instances the second device is capable of supporting at once.

5. The method according to claim 1, in which the parameters of the activation message comprises requested parameters for the new network and the notification message comprises parameters which are used for the new network, in which the new network is a different type than that over which the notification message was sent and the activation message was received.

6. A computer readable memory storing a program of computer executable instructions that when executed by a processor result in actions comprising:
in response to receiving, in a first network of a first network type from a device, a capability advertisement message which comprises role capabilities of the device for at least a second network type, sending, in the first network to the device, an activation message which comprises a request to become active in a second network of the second network type for at least one of the role capabilities of the capability advertisement message and parameters for the second network,
where a role capability for a given network type describes a device role the device can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the device is capable of assuming the given device role in the given network; and
determining, from a notification message received from the device in the first network in response to the activation message, whether the request of the activation message was accepted.

7. An apparatus comprising: at least one memory storing computer program instructions; and at least one processor; in which the at least one memory and the computer program instructions is configured with the at least one memory to cause the apparatus to at least:
receive, in a first network of a first network type from a device, a capability advertisement message which comprises role capabilities of the device for at least a second network type, where a role capability for a given network type describes a device role the device can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the device is capable of assuming the given device role in the given network;
in response to receiving the capability advertisement message, to send, in the first network to the device, an activation message which comprises a request to become active in a second network for at least one of the role capabilities of the capability advertisement message and parameters for the second network; and
receive, in the first network from the device, in response to the activation message, a notification message which indicates whether the request of the activation message was accepted.

8. The apparatus according to claim 7:
in which the role capabilities comprise an indication of at least two roles for each of at least one network type, and at least one of the first and second network types, and for each of the at least two roles an indication of whether the respective role is currently active for the device.

9. The apparatus according to claim 8, wherein the indication of the at least two roles for at least one of the first and second network types comprises an indication for at least three of: access point role in an infrastructure-type network; access point role in a peer-to-peer-type network; non-access point station role in an infrastructure-type network; and non-access point station role in a peer-to-peer-type network.

10. The apparatus according to claim 7, in which the parameters for the new network in the activation message comprise requested parameters, and the notification message comprises parameters which are used for the new network and which are based on the requested parameters.

11. A method comprising:
sending, in a first network of a first network type from a second device, a capability advertisement message which comprises role capabilities for at least a second network type, where a role capability for a given network type describes a device role the second device can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the second device is capable of assuming the given device role in the given network;
in response to sending the capability advertisement message, receiving, in the first network at the second device from a first device, an activation message which comprises a request that the second device become active in a second network of the second network type for at least one of the role capabilities of the capability advertisement message and parameters for the second network; and
in response to the activation message, sending, in the first network from the second device to the first device, a notification message which indicates whether the request of the activation message is accepted.

12. The method according to claim 11, in which the role capabilities comprise an indication of at least two roles for at least one of the first and second network types, and for each of the at least two roles an indication of whether the respective role is currently active for the second device.

13. The method according to claim 12, wherein the indication of the at least two roles for at least one of the first and second network types comprises an indication for at least three of: access point role in an infrastructure-type network; access point role in a peer-to-peer-type network; non-access point station role in an infrastructure-type network; and non-access point station role in a peer-to-peer-type network.

14. The method according to claim 11, in which the capability advertisement message further comprises an indication of how many available network instances the second device is capable of supporting at once.

15. The method according to claim 11, in which parameters of the activation message comprises requested parameters for the new network and the notification message comprises parameters which are used for the new network, in which the new network is a different type than that over which the notification message was sent and the activation message was received.

16. A computer readable memory storing a program of computer executable instructions that when executed by a processor result in actions comprising:

sending, in a first network of a first network type, a capability advertisement message which comprises role capabilities for at least a second network type, where a role capability for a given network type describes a device role an apparatus can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the apparatus is capable of assuming the given device role in the given network;

in response to the capability advertisement message, receiving, in the first network from a device, an activation message which comprises a request to become active in a second network of the second network type for at least one of the role capabilities of the capability advertisement message and parameters for the second network; and in response to the activation message, sending, in the first network to the device, a notification message which indicates whether the request of the activation message is accepted.

17. An apparatus comprising: at least one memory storing computer program instructions; and at least one processor; in which the at least one memory and the computer program instructions is configured with the at least one memory to cause the apparatus to at least:

send, in a first network of a first network type, a capability advertisement message which comprises role capabilities for at least a second network type, where a role capability for a given network type describes a device role the apparatus can assume in a network of the given network type, where the first network type is a first, physical network type, where the second network type is a second, physical network type and where the first network type is different from the second network type, where the capability advertisement message comprises at least one capability field, where each capability field is associated with a given device role in a given network, and where each capability field specifies whether the apparatus is capable of assuming the given device role in the given network;

receive, in the first network from a device in response to the capability advertisement message, an activation message which comprises a request to become active in a second network of the second network type for at least one of the role capabilities of the capability advertisement message and parameters for the second network; and in response to the activation message, send, in the first network to the device, a notification message which indicates whether the request of the activation message is accepted.

18. The apparatus according to claim 17, in which the role capabilities comprise an indication of at least two roles at least, one of the first and second network types, and for each of the at least two roles an indication of whether the respective role is currently active for the apparatus.

19. The apparatus according to claim 18, wherein the indication of the at least two roles for at least one of the first and second network types comprises an indication for at least three of: access point role in an infrastructure-type network; access point role in a peer-to-peer-type network; non-access point station role in an infrastructure-type network; and non-access point station role in a peer-to-peer-type network.

20. The apparatus according to claim 17, in which the parameters for the new network in the activation message comprise requested parameters, and the notification message comprises parameters which are used for the new network and which are based on the requested parameters.

\* \* \* \* \*